US007347616B2

(12) United States Patent
Albright (10) Patent No.: US 7,347,616 B2
(45) Date of Patent: Mar. 25, 2008

(54) SWEPT KICKERS FOR VERTICAL MIXER AUGERS (75) Inventor: Chris Albright, Brodhead, WI (US)

(73) Assignee: Kuhn North America, Inc., Brodhead, WI (US)

( * ) Notice: Subject to any disclaimer, the term of this patent is extended or adjusted under 35 U.S.C. 154(b) by 0 days.

(21) Appl. No.: 11/441,108

(22) Filed: May 26, 2006

(65) Prior Publication Data
US 2007/0274151 A1 Nov. 29, 2007

(51) Int. Cl.
B01F 7/24 (2006.01)

(52) U.S. Cl. .................. 366/314; 366/319; 366/603

(58) Field of Classification Search .............. 366/301, 366/302, 306, 307, 314, 318, 266, 323, 603; 241/101.76, 101.761, 101.8, 260.1, 605
See application file for complete search history.

(56) References Cited

U.S. PATENT DOCUMENTS

| 5,082,188 A * | 1/1992 | Urich ..................... 241/56 |
| 5,429,436 A * | 7/1995 | Stone .................... 366/141 |
| 5,590,963 A * | 1/1997 | Schuler .................. 366/302 |
| 5,601,362 A * | 2/1997 | Schuler .................. 366/309 |
| 5,647,665 A * | 7/1997 | Schuler .................. 366/196 |
| 7,004,617 B2 * | 2/2006 | Albright et al. .......... 366/299 |
| 2004/0008575 A1 * | 1/2004 | Albright et al. .......... 366/299 |
| 2004/0252583 A1 * | 12/2004 | Van Der Plas ........... 366/314 |
| 2005/0169103 A1 * | 8/2005 | Joranlien et al. ......... 366/314 |

FOREIGN PATENT DOCUMENTS

| EP | 1417999 A2 * | 5/2004 |
| GB | 2310793 A * | 9/1997 |
| WO | 93/19842 * | 10/1993 |
| WO | 2007/083998 A1 * | 7/2007 |

* cited by examiner

Primary Examiner—Charles E. Cooley
(74) Attorney, Agent, or Firm—Oblon, Spivak, McClelland, Maier & Neustadt, P.C.

(57) ABSTRACT

A vertical feed mixer apparatus has a container for the reception of feed. The container includes a floor, a wall extending away from the floor such that the wall is disposed above the floor. The wall has a top opening disposed remotely from the floor to define an enclosure for feed received through the top opening. The container has a discharge opening in the wall adjacent to the floor. There is at least one auger disposed within the enclosure. The auger includes an auger core with an axis of rotation extending substantially vertically through the floor. The auger has a helical flighting secured to and disposed around the auger core. The auger has at least one swept kicker secured to the auger core or flighting, disposed adjacent to the floor, and configured to discharge the feed through the discharge opening.

18 Claims, 6 Drawing Sheets

SWEPT KICKERS FOR VERTICAL MIXER AUGERS

CROSS-REFERENCE TO RELATED APPLICATIONS

Not Applicable

BACKGROUND OF THE INVENTION

1. Field of the Invention

This invention relates to augers for agricultural mixers, specifically vertical type feed mixers.

2. Discussion of Background Art

Agricultural mixers are used for mixing hay and silage together with other nutrients including animal feed supplements and grains. These feed materials are then discharged and fed to various livestock such as cattle and dairy cows. Sometimes the mixing of such feed includes depositing a whole round or square bale of hay into the mixer. The mixer then cuts and processes the bale into the desired consistency before and during the mixing of the other feed nutrients.

In conventional mixers, there are many different configurations including horizontal augers, reel type arrangements, and vertical augers. In the vertical auger type mixers, the auger designs are generally similar from mixer to mixer. The auger for a vertical type mixer generally consists of a center core on a vertical axis, with helical auger flighting wrapped around this core. The auger flighting has an overall conical appearance, being wider at the base and narrower at the top. The flighting can also consist of a series of paddles arranged in a spiral pattern. Knives are added to the flighting to help cut and process the feed materials. The wide front edge of the flighting at the bottom of the mixer is made to travel close to the flat floor of the mixer, scooping or peeling the material upwards onto the flighting.

In addition to the leading edge at the base of the auger, the augers sometimes include additional bars, paddles, or sections of flighting around the base. These paddles, sometimes called "kickers" help move the material being mixed, urging the material in a particular direction. A conventional kicker generally includes a relatively flat bar or plate which is lower at the front edge than at the rear edge, and can be mounted by itself or in combination with the lighting. The quantity, size, and orientation of the kickers varies depending on the type of materials, type of mixing action, mixing speed, or horsepower consumption desired. These kickers also sometimes include a hardened bar at their leading edge to increase the durability of the auger.

The general principle of a vertical mixer auger is to sweep materials onto the front edge of the lower flighting section, where it is elevated upwards, sliding on top of the flighting sections, to the trailing edge of the upper lighting. As the feed material is carried upwards by the auger flighting, a void is created between the auger flighting and the sidewall of the mixer. The material from above falls downward into this void, causing a continuous boiling action of the material inside the mixer. After mixing is complete, a discharge door is opened and the materials are pushed out of the discharge opening onto a discharge chute or conveyor. If there are no kickers on the auger, then the front edge of the helical flighting helps to urge the feed materials out the door once per auger revolution. If a kicker is utilized, it would normally be positioned on the opposite side of the auger, thus urging feed materials towards the discharge a second time per auger revolution. Additional kickers spaced evenly around the circumference of the auger can be used to attain a smoother flow of feed materials through the discharge opening.

A "straight kicker" is defined as a kicker with a leading edge that forms an angle as seen from above approximately 90° with a plane of the discharge opening as the straight kicker passes by the centerline of the discharge opening during rotation of the auger. When a "straight kicker" is used, feed is urged toward the discharge opening as the outer portion of the kicker approaches the first edge of the discharge opening. As the outer portion of the straight kicker reaches the discharge opening centerline, it stops urging the feed material towards the discharge opening, and begins pulling the feed back into the mixer. Thus, the feed material urged by a straight kicker is mainly discharged between the first edge of the discharge opening and the discharge opening centerline and then is pulled back into the mixer. Therefore, discharge efficiency is reduced.

The vertical mixer also relies on the pressure of the material in the top portion of the machine to help push the materials out the door. Especially in the case of relatively lightweight materials, the discharge area can become clogged or restricted. In these cases, the user must wait until sufficient pressure is built up by the auger or kickers to force the materials out. Conventional augers and kickers have had little success in resolving this particular clogging problem, as the kickers are typically designed with a straight edge radiating from the auger core to facilitate a rotary action, as opposed to an outward action toward the door opening.

Thus, one disadvantage of straight auger kickers is that lightweight materials can clog during attempted discharge from the discharge opening. Another disadvantage of having straight kickers is that feed materials are urged towards the discharge opening only during the first half of the rotation past the discharge opening, after which materials are pulled back inward. Yet another disadvantage of having straight kickers is that the feed materials tend to pulse as they are discharged through the discharge opening, rather than discharge with a more desirable steady flow.

SUMMARY OF THE INVENTION

Accordingly, it is an objective of the present invention to provide a vertical mixer with swept kickers, which overcomes one or more of the problems associated with conventional mixers. Other non-limiting objects and advantages of certain embodiments of the invention include:

to provide a mixer which has improved interaction of the feed materials between the container and the discharge opening;

to provide a mixer in which feed materials are discharged in a more even manner, providing a smooth flow through the discharge opening when the discharge door is opened;

to provide a mixer in which the outer portion of the kickers continue to push the feed materials toward the discharge opening along more of the length of the discharge opening, providing a faster discharge speed; and/or to provide a mixer in which the kickers help to eliminate clogging of lighter weight feed materials being discharged through the discharge opening.

In accordance with the present invention, a vertical type mixer comprises an auger with swept kickers, to help discharge feed materials smoothly and quickly.

One non-limiting embodiment of the present invention includes a vertical feed mixer apparatus with a container for the reception of feed. The container includes a floor, a wall extending away from the floor such that the wall is disposed above the floor. The wall has a top opening disposed remotely from the floor to define an enclosure for feed received through the top opening. The container has a discharge opening in the wall adjacent to the floor. There is at least one auger disposed within the enclosure. The auger includes an auger core with an axis of rotation extending substantially vertically through the floor. The auger has a helical flighting secured to and disposed around the auger core. The auger has at least one swept kicker secured to the auger core or flighting, disposed adjacent to the floor and configured to discharge the feed through the discharge opening.

DETAILED DESCRIPTION OF THE INVENTION

Figure 1:
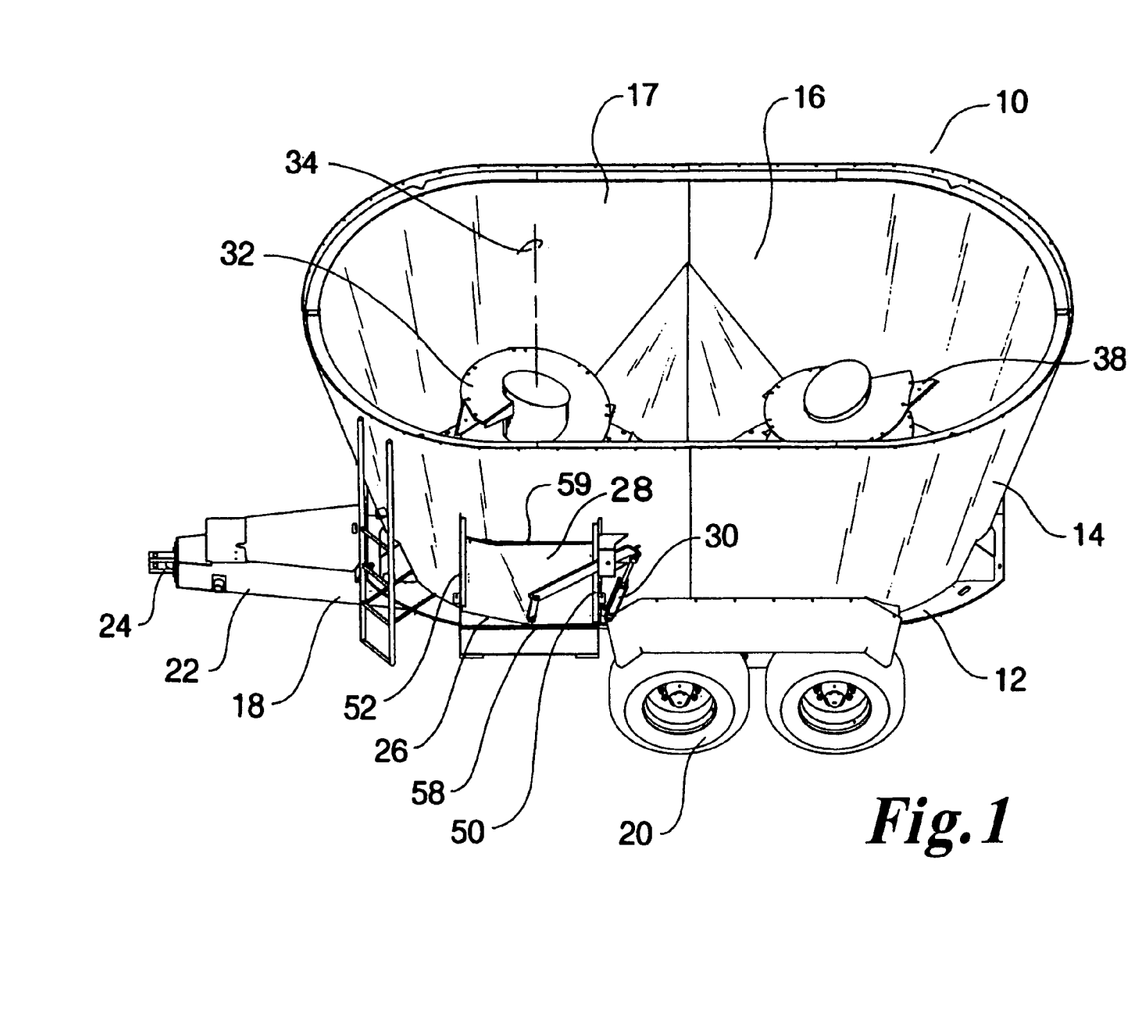
FIG. 1 is perspective view of a twin auger vertical feed mixer according to one non-limiting embodiment of the present invention.
Figure 2:
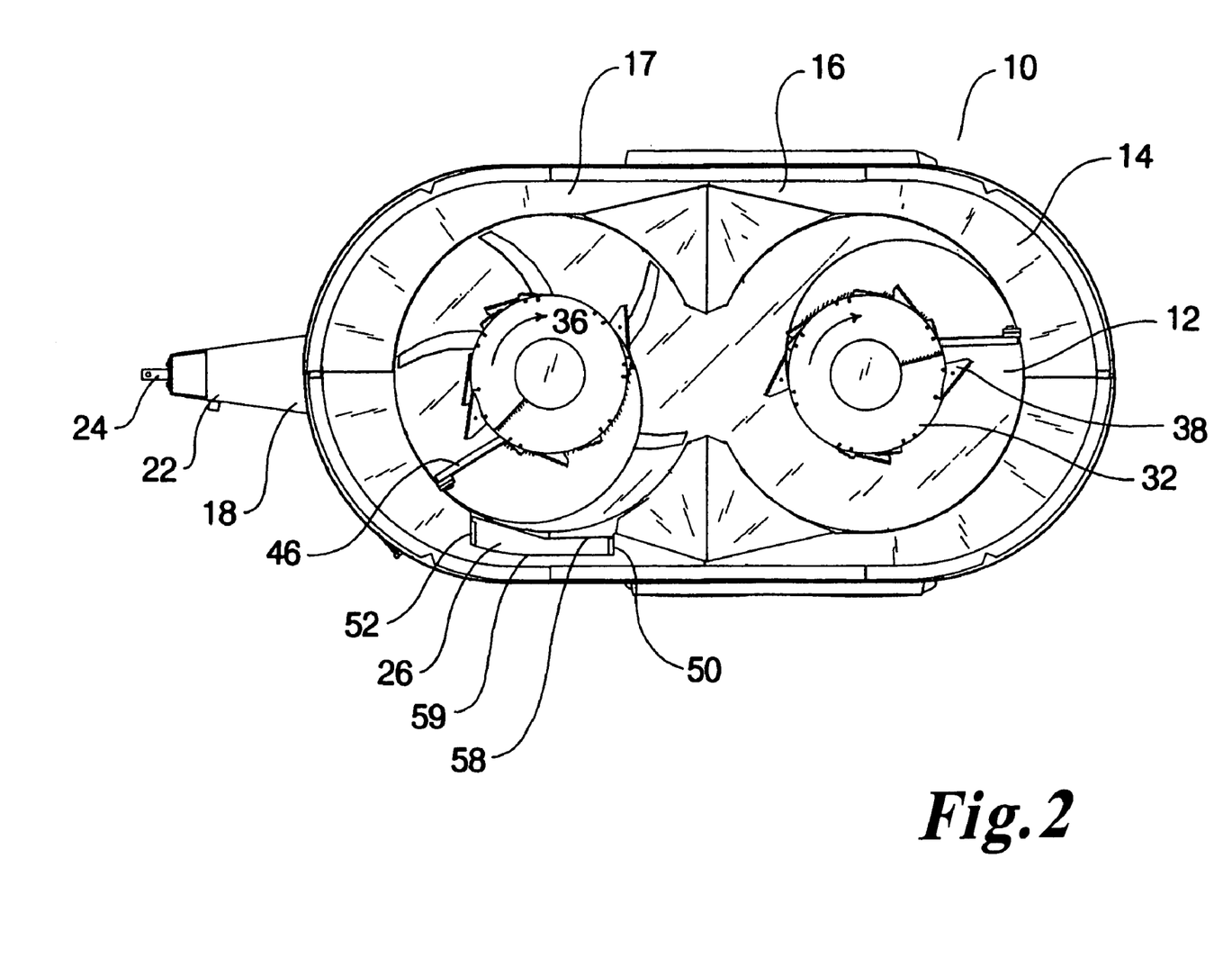
FIG. 2 is a top view of the twin auger vertical feed mixer shown in FIG. 1.

With reference to the FIGS. 1 and 2, a vertical feed mixer is generally designated by the reference number 10. The mixer includes a floor 12 and a wall 14 attached to the floor. The combination of the floor 12 and wall 14 defines a container 16 with a top opening 17. The mixer is mounted upon a frame 18 including wheels 20. A tongue 22 extending from the frame 18 is adapted to be hitched to a tractor or other prime mover via a hitch 24 so that the mixer may be pulled in a direction of travel. In other words, the wheels 20 beneath the frame 18 allow the mixer to be pulled in a line behind a vehicle so that feed may be mixed and discharged over a larger area. The wall 14 includes a discharge opening 26 adjacent to the floor 12, with a discharge door 28 movable between open and closed positions by a hydraulic cylinder 30. An auger 32 is rotatably mounted within the container 16 and rotates around an axis of rotation 34 in a direction of rotation 36. The auger 32 can include sharpened knives 38 located around its perimeter.

The discharge opening 26 can be located anywhere along the wall 14 adjacent to the floor 12 of the vertical feed mixer 10. A first side edge 50 is the edge (usually vertical) of the discharge opening 26 that a given point on the auger 32 passes first as the auger 32 rotates in the direction of rotation 36. A second side edge 52 defines the other edge (usually vertical) of the discharge opening 26 and is the last edge of the discharge opening that a given point on the auger passes as the auger rotates in the direction 36. Accordingly, the line between the first side edge 50 and the second side edge 52 is the discharge length of the discharge opening 26. The lower and upper extremities of the discharge opening 26 are defined as a lower edge 58 and an upper edge 59. While the discharge opening 26 is represented in FIGS. 1 and 2 as having a generally rectangular shape, other shapes such as, for example, circular or triangular are within the scope of the invention. When materials are rotated inside the container 16 by the auger 32 in the direction of rotation 36, the materials contact the first side edge 50 of the discharge opening 26 before contacting the second side edge 52.

Figure 3:
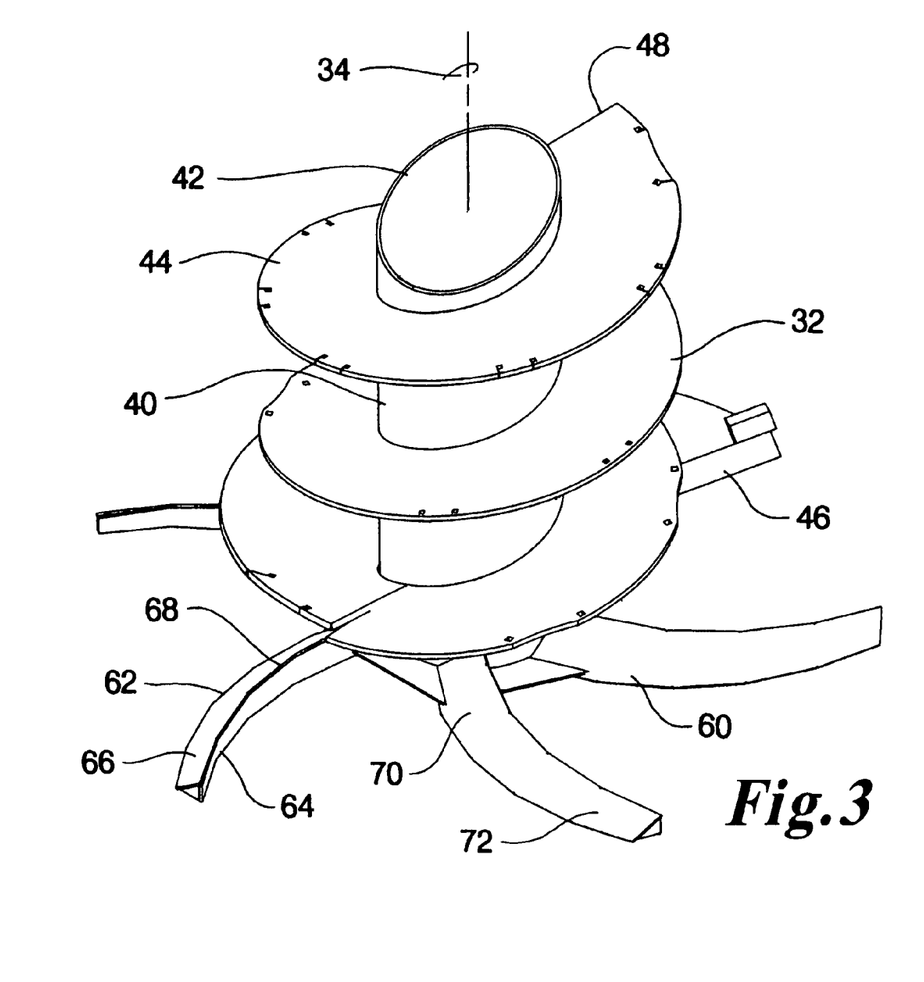
FIG. 3 is a perspective view of one auger shown in FIG. 2.

With reference to FIG. 3, an auger core 40 is disposed coaxially with the axis of rotation 34 and includes a core top 42. Helical flighting 44 is wrapped around the auger core 40 with generally wider flighting at the bottom and narrower flighting at the top so that the auger is roughly cone shaped. The helical flighting 44 includes a front edge 46 which is generally parallel and adjacent to the floor 12 and configured to scoop the feed materials onto its surface. The helical flighting 44 also includes a back edge 48 located near the core top 42 of the auger core 40.

The auger 32 also includes at least one swept kicker 60. The swept kicker 60 includes a leading edge 62 and a trailing edge 64, both of which are typically adjacent to the floor 12 such that they are in sliding contact or slightly separated from the floor 12. For example, the distance between the leading edge/trailing edge and the floor can be in a range of about 0 to 10 mm and preferably about 3 mm to 9 mm. The swept kicker 60 further includes an inclined face 66 between the leading edge 62 and a top edge 68. The angle of the inclined face 66 is variable depending on the feed materials to be mixed, and can range from zero degrees (horizontal) to 90 degrees (vertical). In a preferred embodiment, the angle is between zero and 90 degrees in order to enhance the lifting capability of the swept kicker 60.

Figure 4:
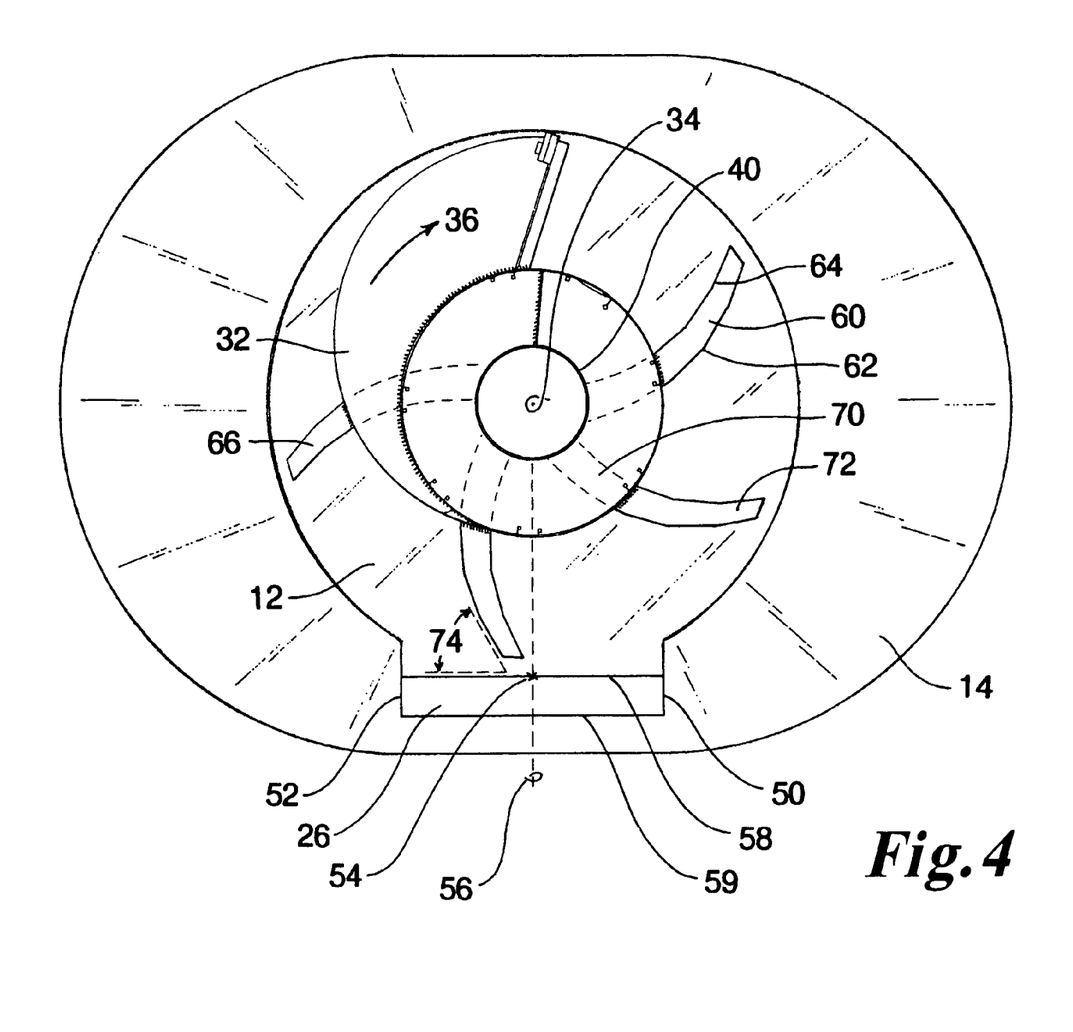
FIG. 4 is a top view of a single auger vertical feed mixer.

As shown in FIG. 3 and FIG. 4, the swept kicker 60 can be attached to the auger core 40 at an inner portion 70, and the opposite end of the swept kicker 60 is defined as the outer portion 72. The swept kicker 60 can also be attached to the flighting 44. The leading edge of the outer portion 72 angles away (is swept) from the direction of rotation 36 so that the feed materials are urged by the swept kicker 60 toward the discharge opening 26 over the entirety of the discharge opening 26 when the auger 32 is rotated in a direction of rotation 36 as will be explained as follows. The lower edge 58 of the discharge opening 26 and a tangent of the leading edge of the outer portion 72 of the swept kicker 60 therebetween define a swept angle 74. Preferably, the swept angle is maintained between 30 and 89 degrees, more preferably between 45 and 89 degrees. Preferably, the swept angle does not exceed 60 degrees, although other angles are possible. When the leading edge of the outer portion 72 is not curved, then a tangent of the leading edge of the outer portion 72 is a straight line running along the leading edge of the outer portion 72. When the leading edge of the outer portion 72 is curved, then the tangent is defined as a line intersecting the outermost portion of the curve at a single point. The quantity of swept kickers 60 on an auger 32 is variable depending on local conditions and the feed materials to be mixed. Further, the swept kickers may vary in shape and size. For example, in one non-limiting embodiment, one or more swept kicker 60 is straight or partially straight while one or more others are curved. Further, the angle 74 may vary among swept kickers 60 in the same mixing apparatus.

Figure 5:
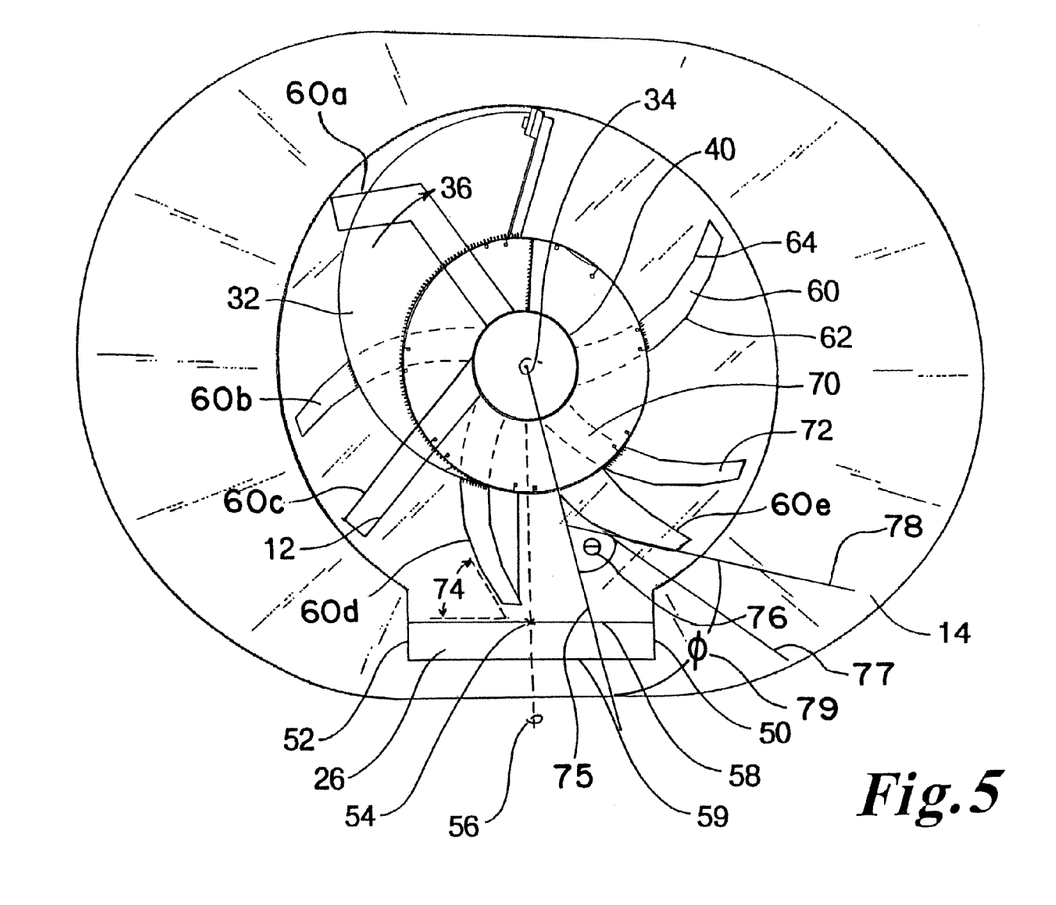
FIG. 5 is a top view of a single auger with a variety of different swept kickers attached.

As shown in FIGS. 4 and 5, the discharge opening 26 is located along the wall 14 adjacent to the floor 12 of the vertical feed mixer 10. A first side edge 50 is the vertical edge of the discharge opening 26 opposite the direction of rotation 36. A second side edge 52 defines the other vertical edge of the discharge opening 26. A point centered between the first side edge 50 and the second side edge 52 defines the discharge center 54. A line drawn between the axis of rotation 34 and the discharge center 54 defines a discharge centerline 56. The lower and upper extremities of the discharge opening 26 are defined as a lower edge 58 and an upper edge 59.

FIG. 5 shows a variety of swept kickers 60a-60d, each of which are different embodiments of the present invention.

With regard to swept kicker 60a, the "hockey stick" shape of the kicker ensures that the angle 74a remains less than 90° as the swept kicker 60a passes by the discharge opening 26. The swept kicker 60a is a relatively simple swept kicker embodiment to manufacture.

With regard to swept kicker 60c, this embodiment of the present invention ensures that the angle 74b remains less than 90° by virtue of its eccentric attachment to the auger 32. As the swept kicker 60c may be made from a substantially straight piece of material, the swept kicker 60c is a relatively simple swept kicker to manufacture. "Substantially straight" means that the leading edge of the swept auger 60c is over a majority of its length, linear as viewed from above the auger 32.

With regard to the swept kicker 60d this embodiment demonstrates that the trailing edge 64 need not be shaped similarly to the leading edge 62. By extending the trailing edge 64 so that the swept kicker has a somewhat half-moon shape, the lifting ability of the swept kicker 60d is enhanced.

With regard to swept kicker 60e, an angle 76 is formed between a tangent 77 and a radial projection 75 extending from the axis of rotation 34 through a point at which a leading edge of the swept kicker 60e is attached to the auger 32. As shown in FIG. 5, the tangent 77 is taken at a point relatively close to the point at which the swept kicker 60e is attached to the auger 32. A second angle 79 is formed between the radial projection 75 and a tangent 78 taken at a point on the swept kicker 60e farther outward from the axis of rotation 34 than the point at which the tangent 77 is taken. The angle 79 is greater than the angle 76. In other words, the swept kicker is swept away from the direction of rotation 36 at a progressively greater angle as the swept kicker extends away from the axis of rotation 34. Thus, the ability of the swept kicker 60e to urge feed material outward is enhanced. The swept kicker 60b is generally curved As shown in FIG. 5, the leading edges of the segments of the swept kicker (such as 60, 60d, 60e, and 72) form progressively increasing angles with respect to the radial projection 75 such that the outermost segment form the largest angle.

Figure 6:
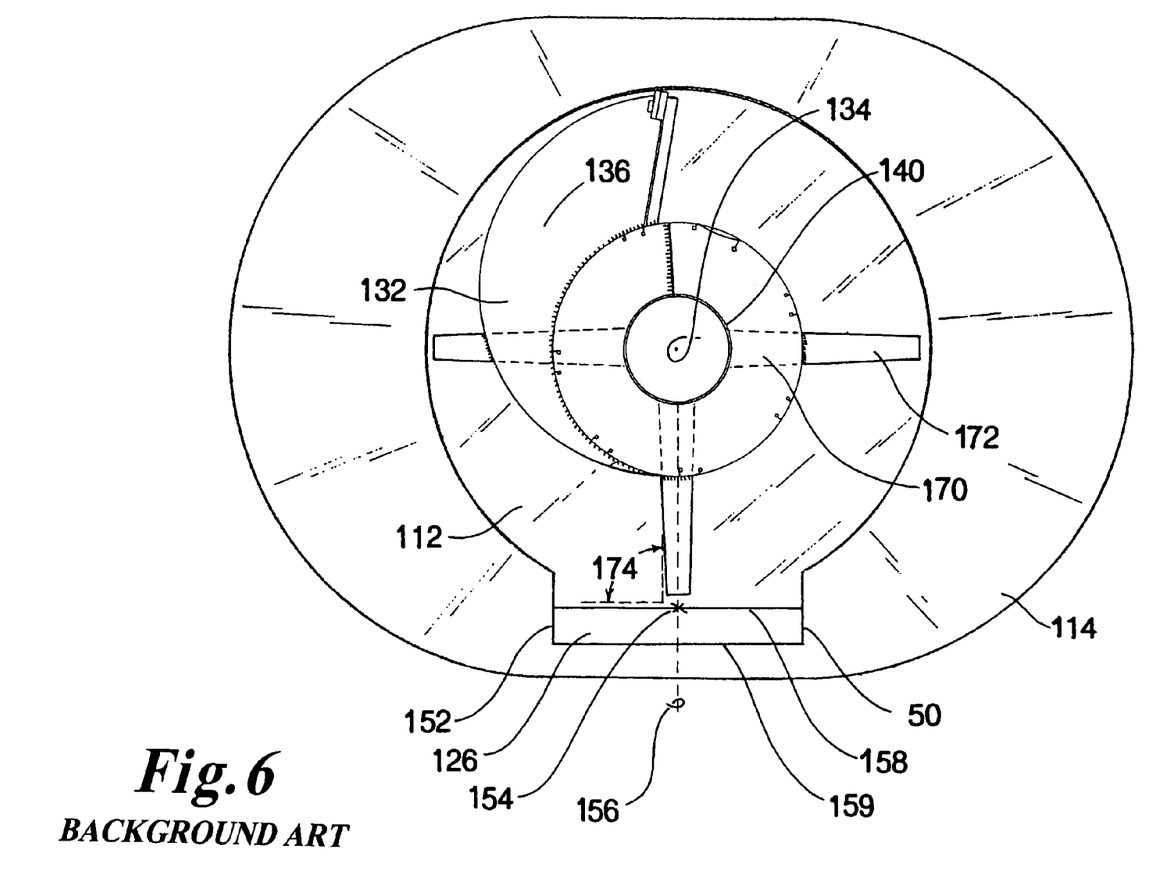
FIG. 6 is a top view of an auger with conventional straight kickers.

With reference to FIG. 6, the drawing shows an auger 132 with conventional straight kickers 180. The straight kicker 180 is attached to the auger core 140 at an inner portion 170, and the opposite end of the straight kicker 180 is defined as the outer portion 172. The discharge opening 126 is defined by first edge 150, second edge 152, lower edge 158, and upper edge 159.

Operation

In operation, a tractor is connected to the hitch 24 to transport the vertical mixer 10 as required. A driveline arrangement from the power take-off (PTO) of the tractor powers the auger 32 via drivelines, gearboxes, chains and sprockets, or other means well known in the industry. Hay or other long stemmed forages in the form of large round or square bales can be added into the container 16 through the top opening 17 while the auger 32 is rotating. Additional feed materials including grains, silage, and other feed supplements can then be added into the container 16, and mixed with the hay. During this mixing action, the discharge door 28 is closed so that no feed material is discharged through the discharge opening 26.

As the auger 32 rotates, a portion of the material being mixed is swept up by the front edge 46 and carried upwards toward the back edge 48, while a portion of the feed floats over the helical flighting 44 and toward the floor 12. When the feed material reaches the back edge 48, it falls outward and downward between the auger 32 and container 16, thus creating a cascading motion which mixes the feed materials. The material left on the floor 12 remains relatively stationary until it is again swept up by the front edge 46 or by the swept kicker 60.

The swept kicker 60 sweeps up the material on the floor 12, causing the feed to be lifted and urged in a direction of rotation 36. When the discharge door 28 is closed, the swept kicker 60 simply pushes the feed materials around the circumference of the floor 12. At the completion of the mixing operation, the hydraulic cylinder 30 is actuated to open the door 28 so that feed materials can be discharged out of the discharge opening 26. When the discharge door 28 is opened, the swept kicker 60 cooperates along with the front edge 46 of the auger 32 to help discharge the feed materials through the discharge opening 26.

In the case of a straight kicker 180 as shown in FIG. 6, the feed materials on the floor 112 are pushed outward through the discharge opening 126 when the outer portion 172 of the straight kicker 180 reaches the first edge 150 until the straight kicker 180 is aligned with the discharge centerline 156 at the center 154 of the discharge opening. When the straight kicker 180 is aligned with the discharge centerline 156, the swept angle 174 between the straight kicker 180 and the lower edge 158 of the discharge opening 126 is approximately 90 degrees. As the straight kicker 180 rotates in the direction 136 around the axis of rotation 134 toward the second edge 152, the swept angle 174 becomes greater than 90 degrees, and the straight kicker 180 begins to pull material away from the discharge opening 126 and moves the material along the wall 114.

In the case of the swept kicker 60 as shown in FIGS. 2-5, the feed materials are likewise pushed outward through the discharge opening 26 when the outer portion 72 of the swept kicker 60 reaches the first edge 50. However, unlike the straight kicker 180 of the background art, the outer portion 72 of the swept kicker 60 maintains a swept angle 74 of less than 90 degrees until after it reaches the second edge 52 of the discharge opening 26. This acute swept angle 74 enhances the ability of the swept kicker 60 to push the feed materials outward through the discharge opening 26 for the entire length of its travel past the discharge opening 26.

Accordingly, the vertical mixer includes at least one auger with one or more swept kickers which help to discharge the feed materials through the discharge opening. The vertical mixer of the present invention can include multiple augers 32 inside a single container 16 to allow larger mixing capacities. Furthermore, any combination of augers with straight and swept kickers may be used.

Although the description above contains many specifics, these should not be construed as limiting the scope of the invention but as merely providing illustrations of some of the presently preferred embodiments of this invention. Thus the scope of the invention should be determined by the appended claims and their legal equivalents, rather than by the examples given. From the foregoing, it can be seen that the present invention accomplishes at least some of the stated objectives.

What is claimed is:

1. A vertical feed mixer apparatus comprising:
   a container including
   a floor, a wall extending away from said floor such that said wall is disposed above said floor, said wall defining a top opening disposed remotely from said floor and configured to receive feed, said floor and said wall defining therebetween an enclosure for the feed received through the top opening, a discharge opening in said wall adjacent to said floor;

at least one auger disposed within said enclosure and configured to rotate in a direction of rotation;

said auger including an auger core with an axis of rotation extending substantially vertically through the floor, a helical flighting secured to and disposed around said auger core to rotate in the direction of rotation, at least one swept kicker secured to said auger core or flighting, adjacent to said floor, including a plurality of segments and configured to discharge said feed through said discharge opening, leading edges of the plurality segments of the swept kicker generally defining a curve along substantially a full length of a leading edge of the swept kicker such that a first angle is formed between a leading edge of a first segment of the swept kicker at a point of attachment to the auger core or flighting and a radial projection extending from the axis of rotation at the point of attachment, a second angle, larger than the first angle, is formed between the radial projection and a leading edge of a second segment, which second segment is adjacent the first segment, and a third angle, larger than the second angle, is formed between the radial projection and the leading edge of a third segment, wherein an outermost end of the swept kicker is a free end.

2. The mixer apparatus of claim 1, wherein each of the angles arc from the radial projection to the respective leading edge in a direction opposite from said direction of rotation of said auger.

3. The mixer apparatus of claim 1, wherein said swept kicker includes an inner portion and an outer portion.

4. The mixer apparatus of claim 3, wherein said discharge opening includes a lower edge, a first side edge, and a second side edge, wherein the third segment of said swept kicker and said lower edge of said discharge opening define a swept angle.

5. The mixer apparatus of claim 4, wherein said swept angle is less than 90 degrees when said outer portion of said swept kicker is between said first side edge and said second side edge of said discharge opening.

6. The mixer apparatus of claim 4, wherein said swept angle remains less than 90 degrees when said outer portion of said swept kicker is rotated on a path between said first side edge and said second side edge of said discharge opening.

7. The mixer apparatus of claim 6, wherein said swept angle is between 45 to 89 degrees when the swept kicker is positioned at the second side edge.

8. The mixer apparatus of claim 6, wherein said swept angle remains less than 60 degrees when said outer portion of said swept kicker is rotated on a path between said first side edge and said second side edge of said discharge opening.

9. The mixer apparatus of claim 1, wherein said auger includes a plurality of said swept kickers.

10. The mixer apparatus of claim 1, wherein said swept kicker includes a surface inclined with respect to the floor at an angle greater than 0° and less than 90°.

11. The mixer apparatus of claim 10, wherein said inclined face extends along substantially a full length of the swept kicker.

12. The mixer apparatus of claim 10, wherein said inclined face is wider at an inner portion than at an outer portion.

13. The mixer apparatus of claim 1, wherein said swept kickers cooperate with said floor to discharge said feed through said discharge opening.

14. The mixer apparatus of claim 1, wherein the outermost end is proximate to the wall.

15. A vertical feed mixer apparatus said apparatus comprising:

a container for the reception including a floor, a wall extending away from said floor such that said wall is disposed above said floor, said wall defining a top opening disposed remotely from said floor and configured to receive feed, said floor and said wall defining therebetween an enclosure for the feed received through the top opening, a discharge opening in said wall and extending along a discharge length, at least one auger disposed within said enclosure and configured to rotate in a direction of rotation;

said auger including an auger core with an axis of rotation extending substantially vertically through the floor, a helical flighting secured to and disposed around said auger core, means for urging the feed toward the discharge opening along an entirety of the discharge length, said means for urging including a plurality of segments, leading edges of the segments generally defining a curve extending along substantially an entire leading edge of said means such that leading edges of, the plurality of segments define, respectively, progressively increasing angles with a radial projection extending from the axis of rotation, such that, with respect to the radial projection:

a leading edge of a second segment attached to a first segment, which first segment is an innermost segment with respect to an axis of rotation, defines a larger angle than is defined by the first segment, a leading edge of a third segment adjacent the second segment defines a larger angle than is defined by the second segment, the means including an outermost end which is a free end.

16. The mixer apparatus of claim 15, wherein the outermost end is proximate to the wall.

17. A vertical feed mixer apparatus comprising:

a container including a floor, a wall extending away from said floor such that said wall is disposed above said floor, said wall defining a top opening disposed remotely from said floor and configured to receive feed, said floor and said wall defining therebetween an enclosure for the feed received through the top opening, a discharge opening in said wall adjacent to said floor, at least one auger disposed within said enclosure and configured to rotate in a direction of rotation, said auger including
an auger core with an axis of rotation extending substantially vertically through the floor,
a helical flighting secured to and disposed around said auger core to rotate in the direction of rotation,
at least one swept kicker including a plurality of segments, an outermost segment including a leading edge that forms an angle, which remains less than 90°, with the discharge opening as the at least one swept kicker sweeps across the entire discharge opening, wherein
leading edges of the plurality segments of the swept kicker generally define a curve along substantially a full length of a leading edge of the swept kicker such that a first angle is formed between a a leading edge of a first segment of the swept kicker at a point of attachment to the auger core or flighting and a radial projection extending from the axis of rotation at the point of attachment,
a second angle, larger than the first angle, is formed between the radial projection and a leading edge of a second segment, which second segment is adjacent the first segment, and
a third angle, larger than the second angle, is formed between the radial projection and a leading edge of a third segment, and the outermost end of the swept kicker is a free end.

18. The mixer apparatus of claim 17, wherein the outermost end is proximate to the wall.

* * * * *